US009657148B2

(12) United States Patent
Al-Harthi et al.

(10) Patent No.: US 9,657,148 B2
(45) Date of Patent: May 23, 2017

(54) FUNCTIONALIZATION OF P(S-CO-MMA)/GRAPHENE NANOCOMPOSITES THROUGH MICROWAVE IRRADIATION

(71) Applicant: King Fahd University of Petroleum and Minerals, Dhahran (SA)

(72) Inventors: Mamdouh Ahmed Al-Harthi, Dhahran (SA); Mukarram Zubair, Al-khobar (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 394 days.

(21) Appl. No.: 14/293,017

(22) Filed: Jun. 2, 2014

(65) Prior Publication Data

US 2015/0344644 A1 Dec. 3, 2015

(51) Int. Cl.
*C08J 3/28* (2006.01)
*C08J 3/20* (2006.01)
*C08J 7/12* (2006.01)
*C09C 1/00* (2006.01)
*C09C 1/56* (2006.01)

(52) U.S. Cl.
CPC . *C08J 3/28* (2013.01); *C08J 3/20* (2013.01); *C08J 7/123* (2013.01); *C09C 1/00* (2013.01); *C09C 1/56* (2013.01); *C08J 2325/14* (2013.01); *C08J 2333/12* (2013.01)

(58) Field of Classification Search
CPC .............................. C08J 3/28; C08J 2325/14
USPC ........................................................ 264/489
See application file for complete search history.

(56) References Cited

U.S. PATENT DOCUMENTS 8,557,916 B1 * 10/2013 Alsharaeh ............ C08F 292/00
524/495
9,382,392 B2 * 7/2016 Al-Harthi ................. C08J 3/28
(Continued)

OTHER PUBLICATIONS

Edreese H. Alsharaeh, et al., "Evaluation of Nanomechanical Properties of (Styrene-Methyl Methacrylate) Copolymer Composites Containing Graphene Sheets", Ind. Eng. Chem. Res., 2013 (2 pages).

(Continued)

*Primary Examiner* — Timothy Kennedy
(74) *Attorney, Agent, or Firm* — Oblon, McClelland, Maier & Neustadt, L.L.P.

(57) ABSTRACT

A method for forming a blend including graphene nanoparticles and a poly(styrene-co-methylmethacrylate), where the method includes melt mixing the poly(styrene-co-methylmethacrylate) and the graphene nanoparticles to obtain a nanocomposite and exposing the nanocomposite to microwave irradiation to bond the methyl methacrylate copolymer to the graphene nanoparticles, in which a content of the graphene nanoparticles is from 0.05 to 2 wt % based on the nanocomposites. A blend composition, including graphene nanoparticles and a poly(styrene-co-methylmethacrylate), where the graphene nanoparticles are dispersed in the poly (styrene-co-methylmethacrylate), the graphene nanoparticles are modified with microwave induced defects, and the free radicals of poly(styrene-co-methylmethacrylate) is bonded to the graphene nanoparticles at the defects.

16 Claims, 8 Drawing Sheets

(56) References Cited

U.S. PATENT DOCUMENTS

2006/0241237 A1* 10/2006 Drzal ................... C08K 7/00
                                                        524/495
2011/0233452 A1*  9/2011 Kim ..................... B82Y 25/00
                                                        252/62.54

OTHER PUBLICATIONS

U.S. Appl. No. 14/283,275, filed May 21, 2014, Al-Harthi, et al.

* cited by examiner

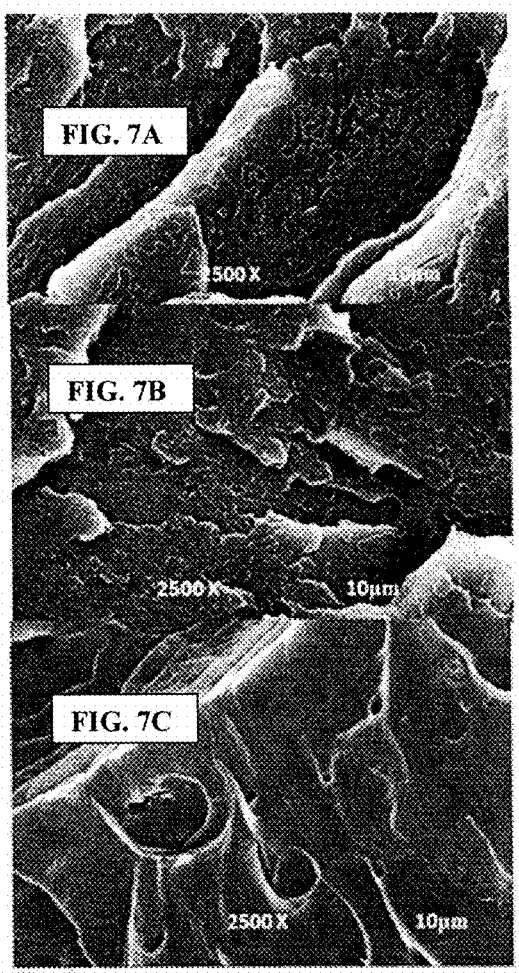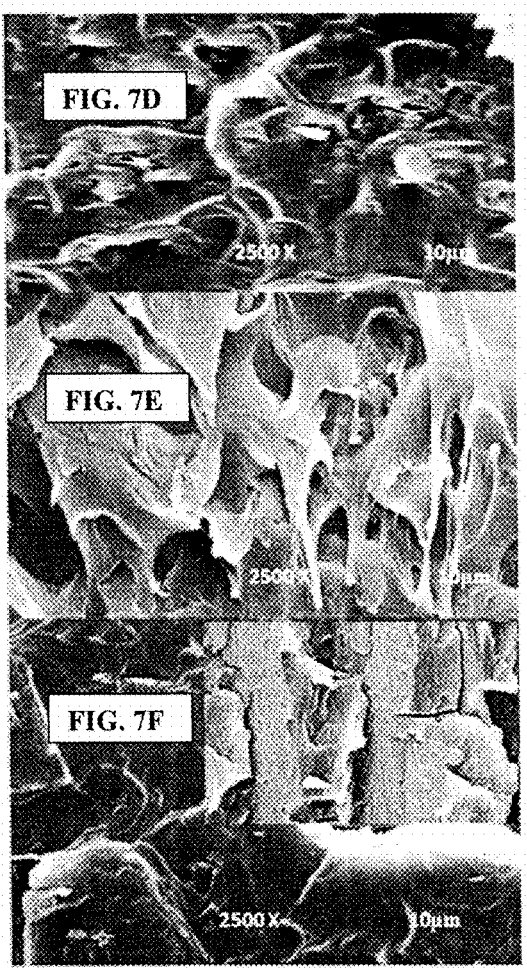

FUNCTIONALIZATION OF P(S-CO-MMA)/GRAPHENE NANOCOMPOSITES THROUGH MICROWAVE IRRADIATION

BACKGROUND OF THE INVENTION

Field of the Disclosure

The present invention relates to a method for enhancing an interaction between graphene nanoparticles and a poly(styrene-co-methylmethacrylate) and to a blend composition obtained by the method.

Description of Related Art

During the past two decades, nanocomposites, especially carbon based nanomaterials, have become a novel class of material. When incorporated into a polymer matrix, nanocomposites have revealed remarkable improved properties, at very low loading content. In particular, graphene and its polymer composites have attracted applications in modern science and technology. "See Stankovich. S, Dikin. D. A, Dommett. G. H. B, Kohlhaas. K. M, Zimney. E. J, Stach. E. A, Nature. 2006, 442, 282-286; Si. Y, Samulski. T, Nano. Lett. 2008, 8, 1679-1682; and Geim. A. K, MacDonald. A. H, Phys. Today. 2007, 60(8), 35-41 (references), each incorporated herein by reference in their entirety." Graphene is the "thinnest material" in the universe, and its unique properties make it more demanding in different technological fields, such as conducting films, sensors, super capacitors, nano electronics, batteries and bio-medical applications. "See Kim. K. S, Zhao. Y, Jang. H, Lee. S. Y, Kim J. M, Kim. K. S, Ahn. J. H, Kim. P, Choi. J. Y, Hong B. H, Nature. 2009, 457, 706-710; Robinson. J. T, Perkins. F. K, Snow. E. S, Wei. Z. Q, Sheehan. P. E, Nano. Lett. 2008, 8, 3137-3140; Stoller. M. D, Park. S. J, Zhu. Y. W, An. J. H, Ruoff. R. S, Nano. Lett. 2008, 8, 3498-3502; Eda. G, Fanchini. G, Chhowalla. M, Nat. Nano. technol. 2008, 3, 270-274; Yoo. E, Kim. J, Hosono. E, Zhou. H, Kudo. T, Honma. I, Nano. Lett. 2008, 8, 2277-2282; and Xu. Y, Bai. H, Lu. G, Li. C, Shi. G, J. Am. Chem. Soc. 2008, 130, 5856-5857 (references), each incorporated herein by reference in their entirety."

Polystyrene (PS) and poly(methyl methacrylate) (PMMA) are widely used commodity plastics after polyolefin. They are applied in different fields such as bio materials, protective coatings, microelectronics, tissue engineering and solar technology. "See Burdick. J. A, Anseth. K. S, Biomaterials. 2002, 23, 4315-4323; George. P. A, Donose. B. C, Cooper-White. J. J, Biomaterials. 2009, 30, 2449-2456; L. F. Thompson, Willson. C. G, Tagawa. S, Polymers for Microelectronics. 1993, ACS; and Yoshihiko. K, Hirofumi. Y, Kunio. A, Langmuir. 2008, 24(2), 547-550 (references), each incorporated herein by reference in their entirety." Incorporation of nanofillers such as carbon nanotubes and graphene into the polymer matrix can considerably enhance the physical and mechanical properties, which is desirable for different kinds of applications. "See Dresselhaus. M, Dresselhaus. G, Avouris. P, Topics in Applied Physics. 2001, 80, Springer, 448; Stankovich. S, Dikin. D. A, Dommett. G. H. B, Kohlhaas. K. M, Zimney. E. J, Stach. E. A, Nature. 2006, 442, 282-286; and Tapas. K, Bhadra. S, Yao. D, Kim. N. H, Bose. S, Lee. J. H, Progr. Polym. Sci. 2010, 35, 1350-1375 (references), each incorporated herein by reference in their entirety."

Melt mixing is a technique used to prepare polymer nanocomposites. It is an easy, economical and efficient technique in which high temperature and strong shear forces are employed to obtain efficient mixing between the polymer matrix and nanofillers. During melt mixing, the polymer chains may degrade. "See Zhang. Z, Zhang. J, Chen. P, Zhang. B, He. J, Hu-G. H, Carbon. 2006, 44(4), 692-698 (reference), incorporated herein by reference in its entirety." This can lead to better dispersion and covalent bond formation of nanofillers with the polymer matrix. "See Zheng. W, Shen. B, Zhai. W, Chen. C, Lu. D, Wang. J, Appl. Mater. Interfaces. 2011, 3, 3103-3109 (reference), incorporated herein by reference in its entirety." To achieve full improvement in the properties of polymer/graphene composites, the most challenging step is to achieve a high level of molecular dispersion and interaction between graphene and the polymer matrix. Different approaches such as the use of peroxide during melt mixing, functionalization of nanoparticles and implication of low molecular weight polymer chains have been investigated. "See McIntosh. D, Khabashesku. V. N, Barrera. E. V, J. Phys. Chem. 2007, 111, 1592-1600; Lerf. A. H, Forster. H, Klinowski. M, J. Phys. Chem. B. 1998, 102, 4477-4482; Bourlinos. A, Gournis. B, Petridis. D, Szabo. D, Szeri. T, Dekany. A, Langmuir. 2003, 19, 6050-6055; Stankovich. S, Piner. R. D, Nguyen. S. T, Ruoff. R. S, Carbon. 2006, 44, 3342-3347; and Wu. G, Tang. Y, Weng. R, Polym Degrad Stab. 2010, 95, 1449-1455 (references), each incorporated herein by reference in their entirety." However, scientists are still looking for more appropriate methods to attain better interaction between graphene and polymer matrix.

Irradiation is an accepted and useful technique to modify the properties of polymer blends. "See Spadaro. G, Valenza. A, Polym Degrad Stab, 2000, 67, 449-454 (reference), incorporated herein by reference in its entirety." The irradiation process causes major reactions such as cross linking, chain scission (degradation), formation of oxygen based functionalities (oxidation) and grafting (in the presence of monomers). "See Gueven. O. International Atomic Energy Agency, Technical meeting, 2004 (reference), incorporated herein by reference in its entirety." Similarly, when radiation is absorbed on the surface of graphene, defects form on graphene which results in a change of structure. "See Teweldebrhan. D, Balandin. A. A, App. Phys. Lett. 2009, 94, 013101 (reference), incorporated herein by reference in its entirety." This free radical formation in polymer chains and disorder in graphene structure after irradiation may provide improved dispersion and hence a strong interfacial interaction between graphene and the polymer matrix. Compared to other radiation techniques, microwave radiation is an easy, cheap and green technique. "See Roberts. B. A, Strauss. C. R, Acc. Chem. Res. 2005, 38(8), 653-661 (reference), incorporated herein by reference in its entirety." It has been used for synthesis of polymer composites, but so far no work has been done to investigate the improvement of interaction between graphene and copolymer composites using microwave radiation. "See Kristian. K. C, Becer. R. U, Schubert. S, Macromolecules. 2011, 44(15), 5825-5842 (reference), incorporated herein by reference in its entirety."

BRIEF SUMMARY

An object of the invention is a method for enhancing an interaction between graphene nanoparticles and a poly(styrene-co-methylmethacrylate).

In an embodiment the method includes melt blending the poly(styrene-co-methylmethacrylate) and the graphene nanoparticles to obtain a nanocomposite and exposing the nanocomposite to microwave irradiation to form defects in the graphene nanoparticles, In another embodiment a content of the graphene nanoparticles is about 1 wt % based on the nanocomposites.

In another embodiment the method further includes compression molding the P(S-co-MMA)/graphene nanocomposites after the melt blending and before the irradiation.

In one embodiment of the invention, the nanocomposites are exposed to microwave irradiation at a frequency of from 2300 to 2600 MHZ at a fixed power of from 900 to 1100 watts.

In another embodiment, the method includes irradiating in cycles of about 60 seconds, with 120 seconds of cooling in between cycles.

In another embodiment, the graphene nanoparticles covalently bond to the methyl methacrylate portion of the poly (styrene-co-methylmethacrylate).

In one aspect of the invention, a blend composition includes graphene nanoparticles and a poly(styrene-co-methylmethacrylate), wherein the graphene nanoparticles are dispersed in the poly(styrene-co-methylmethacrylate), the graphene nanoparticles are modified with microwave induced defects, and the poly(styrene-co-methylmethacrylate) is bonded to the graphene nanoparticles at the defects.

In one embodiment, the P(S-co-MMA)/graphene nanocomposite has an intensity level of the D band at 1357 $cm^{-1}$ ranging from 1800 to 2200 and an intensity of the G band at 1583 $cm^{-1}$ of from 2000 to 2200.

In another embodiment, the storage modulus of the P(S-co-MMA)/graphene nanocomposites ranges from 800 to 1300 MPA at 120° C. and from 1400 to 1800 MPA at 40° C.

In another embodiment of the invention, the electrical conductivity of the P(S-co-MMA)/graphene nanocomposites ranges from $1 \times 10^{-3}$ to $2.0 \times 10^{-3}$ S/cm.

BRIEF DESCRIPTION OF THE DRAWINGS

FIG. 7A is an SEM image of the non-irradiated sample of P(S-co-MMA)/G1 composite.

FIG. 7B is an SEM image of the 5 minute irradiated sample of P(S-co-MMA)/G1 nanocomposite.

FIG. 7C is a SEM image of the 10 minute irradiated sample of P(S-co-MMA)/G1 composite.

FIG. 7D is an SEM image of the non-irradiated sample of P(S-co-MMA)/G10. nanocomposite.

FIG. 7E is an SEM image of the 5 minute irradiated sample of P(S-co-MMA)/G10. nanocomposite.

FIG. 7F is an SEM image of the 10 minute irradiated sample of P(S-co-MMA)/G10. nanocomposite.

DETAILED DESCRIPTION

Figure 1:
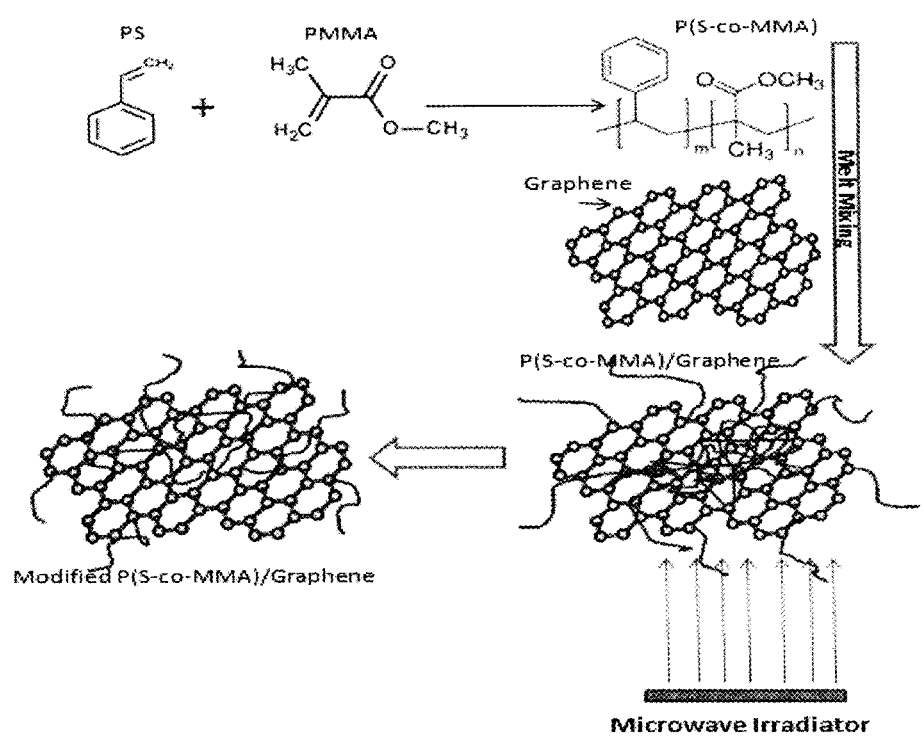
FIG. 1 is a schematic representation of the improvement of dispersion and interaction between P(S-co-MMA) and graphene after microwave irradiation.

The present disclosure includes a method to enhance an interaction between graphene nanoparticles and a poly(styrene-co-methylmethacrylate) (P(S-co-MMA)). The P(S-co-MMA)/graphene nanocomposites were prepared via melt blending and exposed to microwave radiation. The resultant samples were characterized by various techniques and the influence of melt blending, filler content and particularly microwave radiation on the interaction between P(S-co-MMA) and graphene were analyzed. The method results in improved interaction among the copolymer components and graphene and increased electrical conductivity of the nanocomposites after irradiation.

The disclosed method involves the enhancement of interaction between graphene nanoparticles and P(S-co-MMA) by melt blending of the P(S-co-MMA) and the graphene nanoparticles to obtain a nanocomposite, and exposing the nanocomposite to microwave irradiation to form defects in the graphene nanoparticles.

Graphene is a 2-dimensional crystalline allotrope of carbon, where the carbon atoms are densely packed in a regular $sp^2$-bonded hexagonal pattern. Graphene as used herein are in the form of platelets of graphene layers having a thickness of from 200 to 700 angstroms, preferably from 400 to 600 angstroms.

P—(S-co-MMA) is synthesized by free radical polymerization of styrene and methyl methacrylate in the presence of an initiator, such as benzoyl peroxide. The polymerization reaction is performed under a nitrogen environment at a temperature of from 90 to 130° C., preferably from 100 to 120° C., and especially preferably about 110° C. for a time period of from 4 to 8 hours, preferably from 5 to 6 hours. After the polymerization reaction, at least one solvent such as THF is added to the mixture and dissolved. Then, the dissolved polymer solution is precipitated with an excess amount of a second solvent, such as methanol, and then dried in an oven at a temperature of from 30 to 60° C., preferably from 40 to 50° C., for a time period of from 20 to 40 hours, preferably from 23 to 27 hours, especially preferably from 24 to 26 hours.

Preferably, a content ratio (weight/weight) of polystyrene to methyl methacrylate in the P(S-co-MMA) copolymer is from 50-90/20-40, preferably from 60-80/25-35, and especially preferably about 70/30.

Melt blending as used herein involves mixing graphene with P(S-co-MMA) copolymer and mixing at a temperature of from 160 to 200° C., preferably from 170 to 190° C., especially preferably about 180° C. Melt blending at high shear and high temperature leads to the attachment of the polymer chains onto the graphene platelets. Graphene is added in an amount of from 0.05 to 2 wt %, preferably from 0.1 to 1.5 wt %, especially preferably from 0.3 to 1.3 wt %, and particularly preferably about 1.0 wt %, based on 100 wt % of P(S-co-MMA). The melt blending is performed at a speed of from 50 to 70 rpm, preferably from 55 to 65 rpm, and especially preferably about 60 rpm, for a time period of from 5 to 20 min, preferably from 10 to 15 min.

The P(S-co-MMA)/graphene nanocomposites are further prepared into thin sheets by compression molding at a temperature of from 120 to 160° C., preferably from 130 to 150° C., especially preferably about 140° C. under a pressure of from 80 to 110 MPa, preferably from 90 to 110 MPa, especially preferably from 95 to 105 MPa for a time period of from 5 to 15 min, preferably from 7 to 10 min. Then, the thin sheets are cooled to room temperature. A thickness of the thin sheets range from 0.8 to 1.2 mm, preferably from 0.9 to 1.1 mm, and especially preferably about 1.0 mm.

After preparation of the P(S-co-MMA)/graphene nanocomposites, the nanocomposites are subjected to microwave irradiation at a frequency of from 2300 to 2600 MHZ, preferably from 2400 to 2500 MHZ, especially preferably about 2450 MHZ at a fixed power of from 900 to 1100 watts, preferably from 950 to 1050 watts, especially preferably about 1000 watts, in the presence of air. Microwave irradiation of P(S-co-MMA)/graphene nanocomposites result in the formation of free radicals on polymer chains and defects in graphene crystal structure. The polymer chains bond to the graphene in a covalent form. Preferably, bonding is through the methacrylate portion of the copolymer to the graphene, e.g., addition across a C=C bond. This leads to an improvement in interaction of graphene with P(S-co-MMA) polymer matrix and enhanced final property of the nanocomposites.

The irradiation is performed at a treatment time ranging from 2 to 9 minutes, preferably from 3 to 8 minutes, especially preferably from 4 to 7 minutes, and particularly preferably about 5 minutes. This irradiation treatment time range provides at least 80% exfoliated graphene, preferably at least 90% exfoliated, especially preferably at least 95% exfoliated, and particularly preferably completely exfoliated graphene, in the P(S-co-MMA) polymer matrix, which obtains strong interfacial interaction of graphene in the P(S-co-MMA) matrix. If the nanocomposites are irradiated for 10 minutes or more, the storage modulus of the P(S-co-MMA)/graphene nanocomposites decreases. This is due to chain scission and photo degradation of the methyl methacrylate in the P(S-co-MMA)/graphene nanocomposites, which causes formation of oxygen based functionalities and thus reduction in storage modulus of the copolymer and the nanocomposites. Furthermore, irradiation of 10 minutes or more causes the surface to become fractured and degraded, which results in weak interaction and adhesion between the polymer matrix and the dispersed phase of graphene.

Preferably, the nanocomposites are irradiated in cycles. The cycles range from 40 to 80 seconds, preferably from 50 to 70 seconds, especially preferably about 60 seconds. After each cycle of irradiation, the nanocomposites are cooled to room temperature for a time period ranging from 100 to 140 seconds, preferably from 110 to 130 seconds, especially preferably about 120 seconds. The cooling time avoids the effect of heat on the P(S-co-MMA)/graphene nanocomposites.

The present disclosure also includes a blend composition, comprising graphene nanoparticles and a poly(styrene-co-methylmethacrylate), wherein the graphene nanoparticles are dispersed in the poly(styrene-co-methylmethacrylate), and wherein the graphene nanoparticles are modified with microwave induced defects, and the poly(styrene-co-methylmethacrylate) is bonded to the graphene nanoparticles at the defects. The P(S-co-MMA)/graphene nanocomposite has a rough fiber-like surface after microwave irradiation. This fibrous structure leads to high storage modulus and improved conductivity compared to non-irradiated P(S-co-MMA)/graphene nanocomposite.

Preferably, the graphene is completely exfoliated in the P(S-co-MMA) polymer matrix. The graphene peak intensity decreases by at least 80%, preferably at least 90%, especially preferably at least 95% after irradiation, compared to the non-irradiated material.

The intensity level of the D band ($I_D$) at 1357 cm$^{-1}$ of the P(S-co-MMA)/graphene nanocomposites ranges from 1800 to 2200. The intensity level of the G band ($I_G$) at 1583 cm$^{-1}$ of the P(S-co-MMA)/graphene ranges from 2000 to 2200. Accordingly, a ratio $I_D/I_G$ ranges from 0.70 to 1.0, preferably from 0.75 to 0.95, especially preferably from 0.79 to 0.91.

The storage modulus of the P(S-co-MMA)/graphene nanocomposites ranges from 800 to 1300, preferably from 900 to 1200, and especially preferably from 1000 to 1100 MPa at 120° C. and from 1400 to 1800, preferably from 1500 to 1700, especially preferably from 1550 to 1650 MPa at 40° C.

The glass transition temperature of the P(S-co-MMA)/graphene nanocomposites ranges from 130 to 140° C., preferably from 133 to 137° C., especially preferably from 134 to 136° C. When the blend composition is obtained by the present method, the glass transition temperature of the non-irradiated P(S-co-MMA)/graphene nanocomposite is from 1.0 to 4.0° C. higher, preferably from 1.5 to 3.5° C. higher, and especially preferably from 2.0 to 3.0° C., or particularly preferably about 2.5° C. higher than the glass transition temperature of the P(S-co-MMA) before the melt blending. The glass transition temperature of irradiated P(S-co-MMA)/graphene nanocomposite differs in a range of from 0 to 2.0° C., preferably from 0.25 to 1.5° C., and especially preferably from 0.5 to 1.0° C., from the glass transition temperature of the non-irradiated P(S-co-MMA)/graphene nanocomposite.

The electrical conductivity of the P(S-co-MMA)/graphene nanocomposites is from $1 \times 10^{-3}$ to $2.0 \times 10^{-3}$ S/cm, preferably from $1.3 \times 10^{-3}$ to $2.0 \times 10^{-3}$ S/cm.

EXAMPLE

Poly(styrene-co-methyl methacrylate)/graphene nanocomposites were prepared via melt blending and the effects of microwave irradiation on different properties were analyzed. Two different irradiation times (5 and 10 minutes) and three different graphene compositions (0.1, 0.3 and 1 wt %) were employed.

Materials

Styrene (99%), methyl methacrylate (MMA, 99%) and benzoyl peroxide were purchased from Sigma-Aldrich and used as received. Tetra hydrofuran (THF) and methanol were obtained from Pure Chemika. Graphene (96-99%, 50-100 nm) was purchased from Grafen Chemical Industries Co (Turkey).

Synthesis of Poly(Styrene Methyl Methacrylate) Copolymer

Poly(styrene methyl methacrylate) copolymer was produced by free radical polymerization. Benzoyl peroxide of 0.1 wt % of total volume of monomers was used as an initiator. Reaction was carried out in a round bottom flask equipped with a magnetic stirrer at 110° C. for 5 hours under a nitrogen environment. After the reaction, THF (60 ml per 10 ml of monomer) was added to the round bottom flask and stirred for 2-4 days to dissolve the product. The dissolved polymer solution was precipitated with an excess amount of methanol and then dried in an oven at 40° C. for 24 hours.

Preparation of Poly(Styrene Methyl Methacrylate)/Graphene Nanocomposite

P(S-co-MMA)/graphene nanocomposites were prepared using a Brabender Torque Rheometer. Different percentages of graphene (0.1, 0.3 and 1 wt %) were added to P(S-co-MMA) copolymer and mixed for 10 minutes at a temperature of 180° C. at a speed of 60 rpm. Thin sheets of the nanocomposites with approximate thickness of 1 mm were prepared by compression molding for 8 minutes at a temperature of 140° C. under 97 MPa of pressure and cooled to room temperature. Table 1 illustrates the composition of different samples produced.

TABLE 1

Composition of P(S-co-MMA) and its composites

| Sample Name | Copolymer Composition P(S-co-MMA) | P(S-co-MMA) content (g) | Graphene content (mg) |
|---|---|---|---|
| P(S-co-MMA) | 70.6/29.4 | 40 | 0 |
| P(S-co-MMA)/G1 | 70.6/29.4 | 40 | 40 |
| P(S-co-MMA)/G3 | 70.6/29.4 | 40 | 120 |
| P(S-co-MMA)/G10 | 70.6/29.4 | 40 | 400 |

Microwave Irradiation Method

Microwave irradiation of P(S-co-MMA)/graphene nanocomposite was carried out at frequency of 2,450 MHZ at fixed power of 1000 watts with different treatment times. The irradiation was carried out using a domestic microwave oven with an internal turntable.

For irradiation, the samples of dimension (4×10×1 mm) were treated at different treatment times at a constant power of 1000 watts in the presence of air. The samples were irradiated for 2 different durations (5 minutes and 10 minutes) with 60 seconds for each cycle in the presence of air. After each cycle of irradiation, the sample was cooled to room temperature for about 120 seconds to avoid the effect of heat on the polymer graphene composite sample.

Spectroscopic Analysis

The FTIR spectra were recorded by using a Nicolet 6700 spectrometer with resolution of 4 cm$^{-1}$. The functional groups such as carbonyl and hydroxyl groups were compared before and after irradiation in a band range of 1700-1725 cm$^{-1}$ and 3000-3450 cm$^{-1}$, respectively. For Raman spectroscopy, a Raman Aramis (Horiba JobinYvon) instrument with laser power of 0.7 mW and resolution of 473 nm was used. The composition of styrene and methyl methacrylate in the co-polymer was calculated by using NMR spectra estimated at room temperature using a Bruker 500 MHZ spectrometer.

Dynamic Mechanical Analysis (DMA)

The dynamic mechanical properties of the samples before and after irradiation was investigated at a temperature range of from 40° C. to 160° C. in the tension mode at a heating rate of 5° C./min and a frequency of 1 Hz using a Perkin Elmer DMA Q-800. The dynamic mechanical properties were tested under a nitrogen environment at a load of 5N with the average sample size 4×10×1 mm.

Differential Scanning Calorimetry (DSC)

The glass transition temperature of the samples was determined by using a DSC-Q1000, TA instrument. The samples are weighed with ±0.5 mg accuracy and the experiments were carried out in nitrogen environment. The first stage of heating was carried out to remove the thermal history of the sample, if any. The cooling step was done at a rate of 5° C./minute and the final heating at a rate of 10° C./minute was carried out to determine the $T_g$ of the sample.

X-Ray Diffraction (XRD)

XRD studies were carried out using a D8 Advance X-Ray Instrument with a wavelength of λ=15.42 nm and a 2θ range of from 2°-70°.

Electrical Conductivity

Electrical conductivity measurement was carried out using a four probe AIT SR-2000 N/PV machine at a current of 10 nA and 2 volts.

Scanning Electron Microscopy (SEM)

Scanning electron micrographs (SEM) were taken by using a JSM-6460LV (Jeol) SEM. Prior to the experiment, the samples were cryo-fractured using liquid nitrogen and the cross section was sputter coated with gold for 2 minutes to make the surface conductive.

The possible mechanism of P(S-co-MMA)/graphene nanocomposites formation via melt blending and the effect of microwave irradiation are shown in FIG. 1. Melt blending at high shear and high temperature can lead to attachment of the polymer chains onto the graphene platelets. The irradiation caused free radical formation on polymer chains and surface modification of graphene which eventually led to better interaction between them.

FTIR Analysis

Figures 2A, 2B:
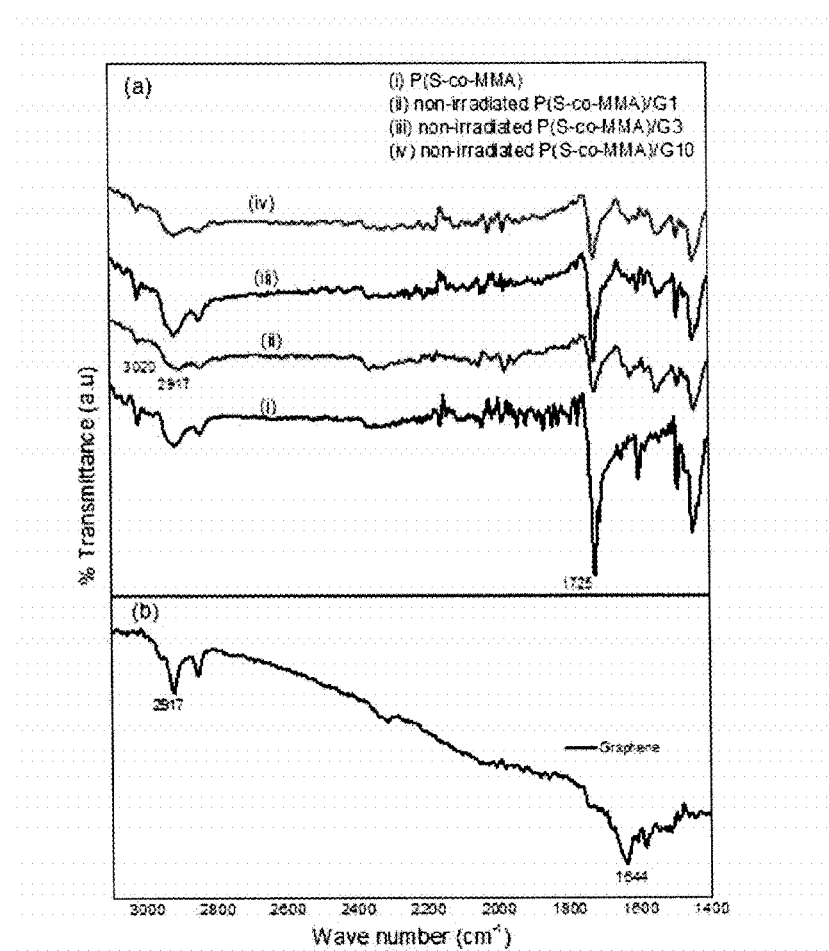
FIG. 2A is graph showing FTIR spectra of control P(S-co-MMA) and non-irradiated P(S-co-MMA)/graphene nanocomposites.
FIG. 2B is a graph showing FTIR spectra of graphene.
Figure 2C:
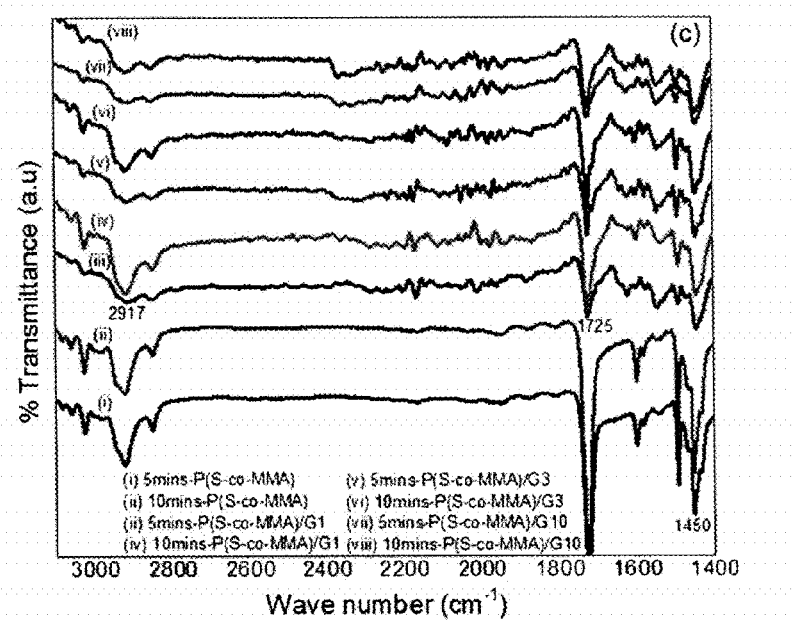
FIG. 2C is a graph showing FTIR spectra of irradiated P(S-co-MMA)/graphene nanocomposites.

FIGS. 2A and 2B show the FTIR spectra of control P(S-co-MMA), and non-irradiated P(S-co-MMA)/graphene nanocomposites, and graphene. FIG. 2C shows the FTIR spectra of irradiated P(S-co-MMA)/G1 nanocomposites. In FTIR spectra of non-irradiated and irradiated P(S-co-MMA)/graphene nanocomposites, the trend of bands are almost similar to the control P(S-co-MMA), with an increase or even disappearance in the intensity of some absorption bands after melt mixing and microwave irradiation. In FIG. 2B, the peak in graphene spectra at 1644 cm$^{-1}$ corresponds to the C=C group of graphene. This peak of graphene shifted to lower intensity in the spectra of non-irradiated P(S-co-MMA)/graphene nanocomposites (FIG. 2A).

In non-irradiated P(S-co-MMA)/G1 and P(S-co-MMA)/G10, the intensity of carbonyl stretching vibration at peak 1725 cm$^{-1}$ was decreased to low intensity as compared to P(S-co-MMA). This may be due to the reaction of graphene with the methyl acrylate (COOCH$_3$) functionality in polymer matrix. "See Liang. C. Y, Krimm. S. J, *Polym. Sci.* 1958, 27, 241-254 (reference), incorporated herein by reference in its entirety." Reduction in intensity of the peaks at 2917 and 3020 cm$^{-1}$ corresponding to the methylene groups was also found in spectra of non-irradiated P(S-co-MMA)/G1 and P(S-co-MMA)/G10 compared to P(S-co-MMA). This demonstrated that some of the copolymer chains tethered to the surface of graphene after melt mixing.

After irradiation for 5 minutes, further decrease in the intensity of absorption band of the carbonyl group at peak 1725 cm$^{-1}$ was found in the spectra of P(S-co-MMA)/graphene nanocomposites. This indicates more grafting of graphene with the methyl acrylate group of the copolymer after 5 minutes of irradiation.

At 10 minutes of irradiation, an increase in the intensity of carbonyl stretching vibrations at peak 1725 cm$^{-1}$ was found in P(S-co-MMA) and P(S-co-MMA)/graphene nanocomposites (FIG. 2C). The enhancement in the absorption band of the carbonyl group after irradiation referred to the photo degradation of methylene group present in P(S-co-MMA) polymer. "See Carlos. J, Suarez. M, Mano. E. B, Ermel. E, Da Costa. M, Maria. I, Bruno. T. *Appl. Polym. Sci.* 2002, 85, 886-895 (reference), incorporated herein by reference in its entirety." This results in the formation of oxygen based functionalities on exposure to microwave radiation.

Raman Analysis

Figure 3A:
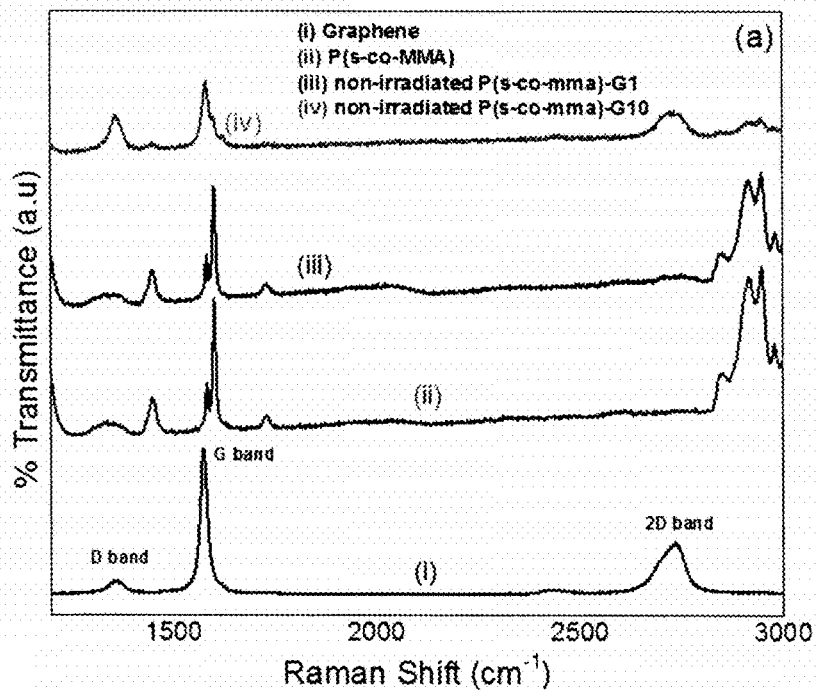
FIG. 3A is a graph showing Raman spectra of graphene, control P(S-co-MMA) and non-irradiated P(S-co-MMA)/G1 and P(S-co-MMA)/G10 nanocomposites.
Figure 3B:
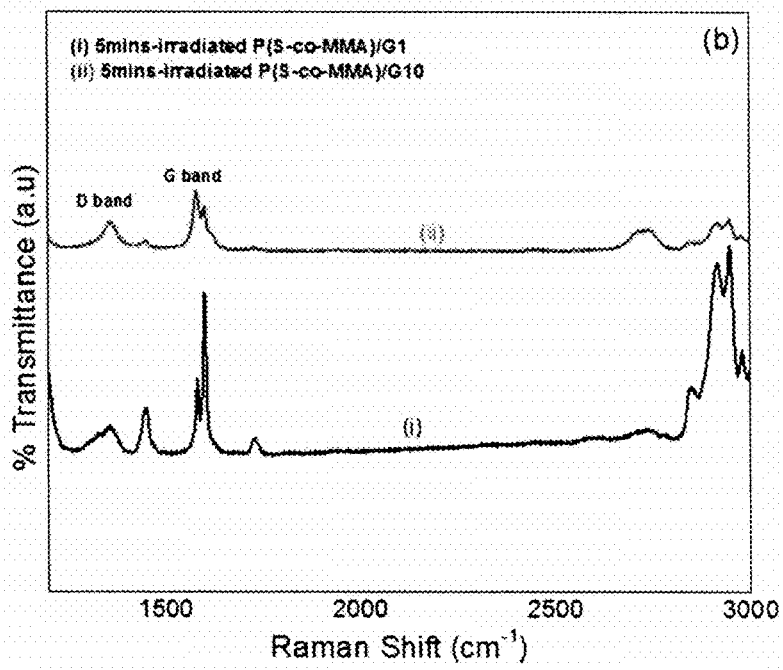
FIG. 3B is a graph showing Raman spectra of irradiated P(S-co-MMA)/G1 and P(S-co-MMA)/G10 nanocomposites.

FIG. 3A shows the Raman spectra of pristine graphene, control P(S-co-MMA), non-irradiated P(S-co-MMA)/G1, and P(S-co-MMA)/G10. FIG. 3B shows the spectra of 5 minutes irradiated P(S-co-MMA)/G1, and P(S-co-MMA)/G10 nanocomposites. The interesting features in Raman spectra of pristine graphene are G-band, D-band and 2D-band. G-band is at 1583 cm$^{-1}$ which corresponds to the $E_{2g}$ phonon at the center of the Brillouin zone or due to the sp$^2$ C=C stretching vibrations. "See Dresselhaus. M. S, Dresselhaus, G. Saito, Carbon. 1995, 33, 925 (reference), incorporated herein by reference in its entirety." The D band (disorder mode) is at 1357 cm$^{-1}$, corresponding to out-plane breathing mode of sp$^2$ atoms. D band is indicative of the presence of the defects in graphene and is an advantageous tool in estimating the level of defects arising in graphene. "See Thomsen. C, Reich. S, Phys. Rev. Lett. 2000, 85(24), 5214-5217; and Ferrari. A. C, Robertson. J, Phys. Rev. B. 2001, 64(7), 075414 (references), each incorporated herein by reference in their entirety." These defects present on graphene are the potential active sites to form covalent bonding with free radicals of P(S-co-MMA) polymer generated during microwave irradiation. The 2D band at around 2700 cm$^{-1}$ is used to examine the quality of graphene.

In FIG. 3A, the very low intensity of D band, and broad peak of 2D band of pristine graphene, indicates its high quality and crystalline nature. "See Ferrari. A. C, Meyer. J. C, Scardaci. V, Casiraghi. C, Lazzeri. M, Mauri. F, Piscanec. S, Jiang. D, Novoselov. K. S, Roth. S, Geim. A. K, Phys. Rev. Lett. 2006 97(18), 187401 (reference), incorporated herein by reference in its entirety." In the case of non-irradiated P(S-co-MMA)/G1 and non-irradiated P(S-co-MMA)/G10 (FIG. 3A), the 2D band of graphene has fully disappeared and shifted to lower intensity respectively. An increase in the intensity of D band (~1357 cm$^{-1}$) was also observed in both non-irradiated P(S-co-MMA)/G1 and non-irradiated P(S-co-MMA)/G10. This significant decrease of the 2D band with an increase in D band intensity of non-irradiated P(S-co-MMA)/G1 indicates the formation of disorder in graphene and may cause better interaction of polymer chains on the surface of graphene during melt blending. "See Patole. A. S, Patole. S. P, Kang. H, Yoo. J. B, Kim. T. H, Ahn. J. H, J. Coll. Interf. Sci. 2010, 350, 530-537 (reference), incorporated herein by reference in its entirety." Similar trends were also found by Patole A S et al. "See Patole. A. S, Patole. S. P, Jung. S. Y, Yoo. J. B, An. J. H, Kim. T. H. 2012. European Polymer Journal. 2012, 48, 252-259 (reference), incorporated herein by reference in its entirety." The characteristic peak of control P(S-co-MMA) in FIG. 3A, was also seen in the Raman spectra of non-irradiated P(S-co-MMA)/G1 which was not present in the non-irradiated P(S-co-MMA)/G10 nanocomposite. This may be attributed to the fact that the graphene is poorly dispersed and weakly interacted within the polymer matrix in the case of P(S-co-MMA)/G10 compared to P(S-co-MMA)/G1. This is further supported by the findings in DMA and SEM as discussed later.

After 5 minutes of irradiation of P(S-co-MMA)/G1 and P(S-co-MMA)/G10 nanocomposites, it was found that the intensity level of D band and G band both increased (FIG. 3B). The increase in the intensity of D band reveals the formation of more disorder in graphene surface after irradiation. This reveals that free radicals were generated by scission of small polymer chains and attached to the defected surface of graphene due to microwave irradiation of nanocomposites. Similar trends have also been observed by McIntosh et al. when SWNT was treated with benzoyl peroxide during melt mixing. "See McIntosh. D, Khabashesku. V. N, Barrera. E. V, J. Phys. Chem. 2007, 111, 1592-1600 (reference), incorporated herein by reference in its entirety." The $I_D/I_G$ ratio of both non-irradiated P(S-co-MMA)/G1 and non-irradiated P(S-co-MMA)/G10 were significantly changed after irradiation as illustrated in Table 2. In addition to this, it was also observed that some characteristic peaks of control P(S-co-MMA) appeared in 5 minutes irradiated P(S-co-MMA)/G10 spectra (FIG. 3B) which was not seen in non-irradiated P(S-co-MMA)/G10. This also confirmed the improvement in interaction between graphene and the P(S-co-MMA) polymer matrix after 5 minutes of microwave irradiation.

TABLE 2

$I_D/I_G$ ratio of P(S-co-MMA)/graphene composite before and after irradiation.

| Samples | D peak(~1357) Intensity | G peak(~1583) Intensity | $I_D/I_G$ |
|---|---|---|---|
| Graphene | 95.24 | 863.17 | 0.11 |
| non-irradiated P(S-co-MMA)/G1 | 906.7 | 1125.3 | 0.76 |
| non-irradiated P(S-co-MMA)/G10 | 1164.8 | 2110.2 | 0.79 |
| 5 mins-irradiated P(S-co-MMA)/G1 | 1831.5 | 2050.1 | 0.89 |
| 5 mins-irradiated P(S-co-MMA)/G10 | 1984.2 | 2189.7 | 0.90 |

XRD Analysis

Figure 4:
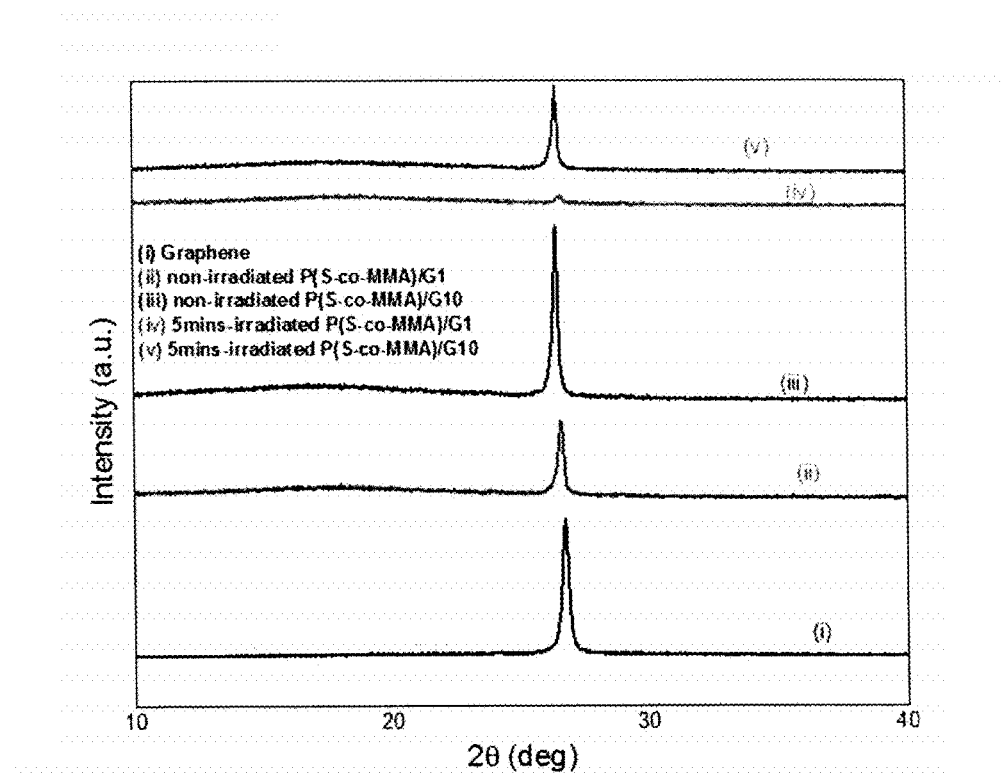
FIG. 4 is a graph showing XRD patterns of graphene, non-irradiated and irradiated P(S-co-MMA)/G1 and P(S-co-MMA)/G10 nanocomposites.

FIG. 4 displays the XRD patterns of pristine graphene, non-irradiated P(S-co-MMA)/G1, P(S-co-MMA)/G10 and 5 minutes irradiated samples of P(S-co-MMA)/G1, P(S-co-MMA)/G10, respectively. The diffraction peak of pristine graphene was observed at about $2\theta=26.7°$. "See Hua. H, Wang. X, Wanga. J, Wana. L, Liu. F, Zheng. H, Chen. R, Xu. C, Chem. Phys. Lett. 2010, 484, 247-253 (reference), incorporated herein by reference in its entirety." It was found that when graphene was incorporated in P(S-co-MMA) polymer matrix via melt blending, the diffraction peak of graphene in XRD pattern of non-irradiated P(S-co-MMA)/G1 and non-irradiated P(S-co-MMA)/G10 increase with the content of graphene (FIG. 4). After 5 minutes of irradiation, the diffraction peak of graphene has almost disappeared and shifted to a low intensity level in the XRD pattern of 5 minutes irradiated P(S-co-MMA)/G1 and 5 minutes irradiated P(S-co-MMA)/G10 nanocomposites respectively. This indicates the formation of more disorder in the graphene structure due to microwave irradiation evident from Raman spectra results, which act as active sites and enhanced interaction of graphene with the P(S-co-MMA) polymer matrix. "See Liang. J, Huang. Y, Zhang. L, Wang. Y, Ma. Y, Guo. T, Chen. Y, Adv. Funct. Mater. 2009, 19, 1-6 (reference), incorporated herein by reference in its entirety." The XRD pattern clearly demonstrates that after 5 minutes of irradiation of the P(S-co-MMA)/G1 nanocomposite, the graphene is completely exfoliated in the P(S-co-MMA) polymer matrix as the diffraction peak of graphene has disappeared, thereby indicating strong interfacial interaction of graphene in the P(S-co-MMA) matrix. "See Liang. J, Huang. Y, Zhang. L, Wang. Y, Ma. Y, Guo. T, Chen. Y, Adv. Funct. Mater. 2009, 19, 1-6; and Du. X. S, Yu. Z. Z, Dasari. A, Ma. J, Mo. M. S, Meng Y. Z, Chem. Mater. 2008, 20, 2066-2068 (references), each incorporated herein by reference in their entirety."

DMA Analysis

Figure 5A:
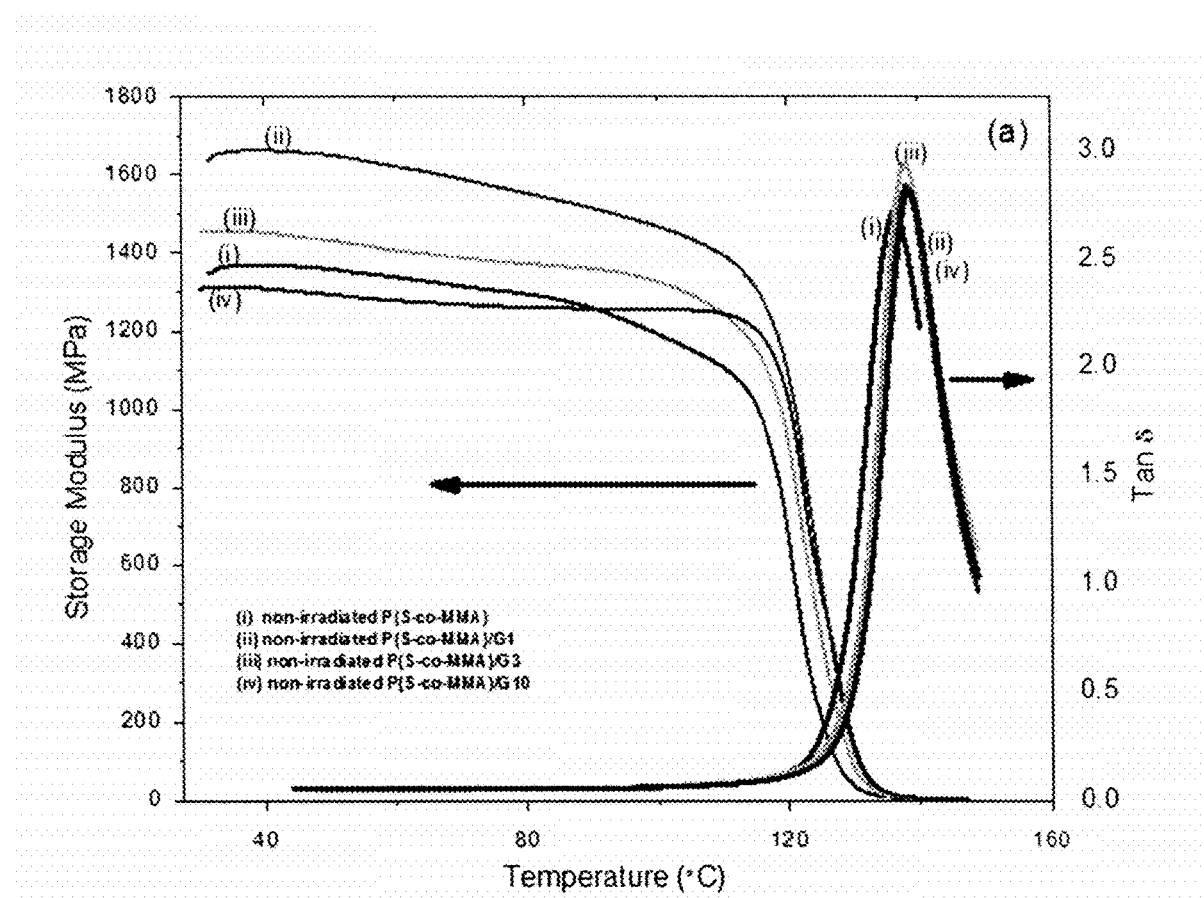
FIG. 5A is a graph showing storage modulus and tan δ curve of control P(S-co-MMA) and non-irradiated P(S-co-MMA)/graphene nanocomposites.
Figure 5B:
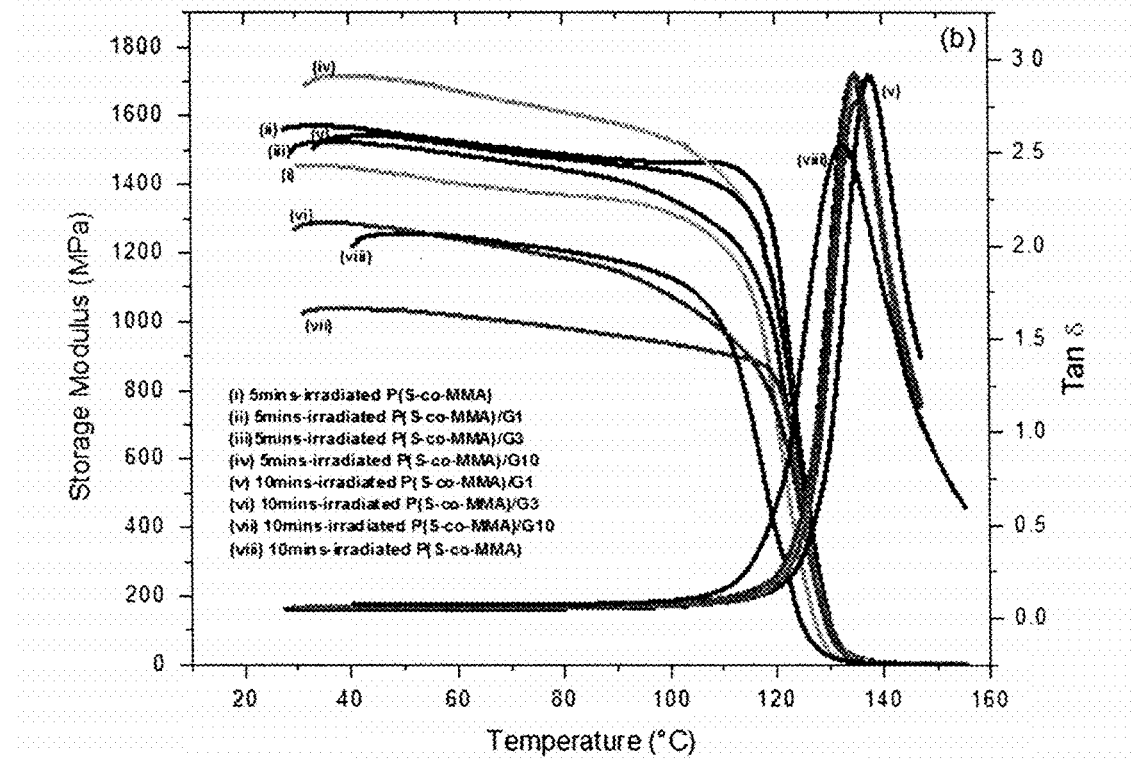
FIG. 5B is a graph showing storage modulus and tan δ curve of irradiated P(S-co-MMA) and P(S-co-MMA)/graphene nanocomposites.

The mechanical properties of non-irradiated and irradiated P(S-co-MMA) and P(S-co-MMA)/graphene nanocomposites were evaluated by DMA (Table 3). FIGS. 5A and 5B demonstrated the storage modulus and tan δ curves of non-irradiated and irradiated P(S-co-MMA) and P(S-co-MMA)/graphene respectively.

At a glassy state (40° C.) (FIG. 5A), the storage modulus of non-irradiated P(S-co-MMA)/G1 and non-irradiated P(S-co-MMA)/G3 nanocomposites, increased to higher values compared to the control P(S-co-MMA) polymer. This increase in storage modulus after incorporation of graphene in the P(S-co-MMA) polymer matrix is attributed to the reinforcing effect of filler on polymer matrix. However, a decrease in the storage modulus, of about 10% was found for non-irradiated P(S-co-MMA)/G10 (FIG. 5A) with respect to control P(S-co-MMA). This might be due to the plasticization effect of graphene agglomerate on P(S-co-MMA) at higher concentration. A similar kind of behavior was observed by Saladino. M. L et al. when silica is incorporated in the PMMA matrix. "See Saladino. M. L, Motaug. T. E, Luyt. A. S, Spinella. A, Nasillo. G, Caponetti. E, Corrigendum, *Polym. Degrad. Stab.* 2012, 97, 452-459 (reference), incorporated herein by reference in its entirety."

The tan δ peak position (FIG. 5A), which is the measure of glass transition temperature ($T_g$) shifted from 132° C. for control P(S-co-MMA) to a higher temperature of 135° C. for the P(S-co-MMA)/graphene nanocomposites. This is due to the fact that the graphene platelets restrict the mobility of polymer chains and hence $T_g$ was increased. However, the $T_g$ did not change significantly with increasing concentration of graphene content (from 0.1 to 1 wt %) in P(S-co-MMA) matrix. This attributes to the weak interfacial interaction of graphene with polymer matrix at higher loading content.

At 5 minutes of microwave irradiation of P(S-co-MMA) and P(S-co-MMA)/graphene nanocomposites, the storage modulus reached a high value (FIG. 5B). For example, at 120° C. after 5 minutes of irradiation of P(S-co-MMA)/G1, the storage modulus was found to increase from 1002 MPa to 1215 MPa (a 21.25% increase compared to non-irradiated P(S-co-MMA)/G1). Similarly, for P(S-co-MMA)/G3 and P(S-co-MMA)/G10 nanocomposites, the storage modulus at 40° C. increases from 1452 MPa to 1523 MPa (5% increase) and from 1308 to 1710 (31% increase) after 5 minutes of irradiation. An increase in storage modulus of control P(S-co-MMA) and nanocomposites after 5 minutes of microwave exposure may be due to formation of cross linked network and improved polymer-filler interaction induced by microwave irradiation. This is due to the formation of free radicals on polymer chains as well as the defects produced on the graphene surface, as observed in FTIR and Raman spectra. "See Compagnini. G, Giannazzo. F, Sonde. S, Raineri. V, Rimini. E, *Carbon.* 2009, 47, 3201-3207 (reference), incorporated herein by reference in its entirety." This produced a stiffer and stronger polymer graphene nanocomposite. Similar results were also found in the irradiation of carbon nano-fibers. "See Maria. C. E. PhD Thesis, University of Dayton, May 2010 (reference), incorporated herein by reference in its entirety." In addition, in FIG. 5B, there is a slight change or shift found on the tan δ peak and thereby slight increase in the $T_g$ of all the P(S-co-MMA)/graphene nanocomposites after 5 minutes of microwave irradiation. Increase in the tan S peak was also detected after 5 minutes of microwave exposure in P(S-co-MMA)/G1 and P(S-co-MMA)/G10 which may be an indication of restriction in chain mobility of polymer chains, which usually happens due to the existence of graphene nano filler. "See Saladino. M. L, Motaug. T. E, Luyt. A. S, Spinella. A, Nasillo. G, Caponetti. E, Corrigendum, *Polym. Degrad. Stab.* 2012, 97, 452-459 (reference), incorporated herein by reference in its entirety."

However at higher irradiation time, i.e. 10 minutes, the storage modulus of P(S-co-MMA) and all P(S-co-MMA)/graphene nanocomposites started to decrease (10.8%, 6.5%, 11.5% and 20% decrease for non-irradiated P(S-co-MMA) and P(S-co-MMA)/G1, P(S-co-MMA)/G3 and P(S-co-MMA)/G10 nanocomposites, respectively). This attributes to the chain scission and photo degradation of the methyl methacrylate in P(S-co-MMA)/graphene nanocomposites (confirmed by FTIR spectra). This caused the formation of oxygen based functionalities and thus resulted in the reduction in storage modulus of copolymer and nanocomposites.

TABLE 3

Storage modulus and $T_g$ obtained from DMA of non-irradiated and irradiated P(S-co-MMA) and P(S-co-MMA)/graphene composites.

| Sample | E (MPa) at 40° C. | E (MPa) at 120° C. | $T_g$(° C.) |
|---|---|---|---|
| control P(S-co-MMA) | 1367 | 677 | 132 |
| non-irradiated P(S-co-MMA)/G1 | 1663 | 1102 | 135 |
| non-irradiated P(S-co-MMA)/G3 | 1452 | 906 | 134 |
| non-irradiated P(S-co-MMA)/G10 | 1308 | 1025 | 135 |
| 5 mins-irradiated P(S-co-MMA) | 1447 | 820 | 133 |
| 5 mins-irradiated P(S-co-MMA)/G1 | 1567 | 1215 | 135 |
| 5 mins-irradiated P(S-co-MMA)/G3 | 1523 | 940 | 135 |
| 5 mins-irradiated P(S-co-MMA)/G10 | 1717 | 1066 | 135 |
| 10 mins-irradiated P(S-co-MMA) | 1219 | 718 | 132 |
| 10 mins-irradiated P(S-co-MMA)/G1 | 1540 | 1067 | 134 |
| 10 mins-irradiated P(S-co-MMA)/G3 | 1285 | 740 | 134 |
| 10 mins-irradiated P(S-co-MMA)/G10 | 1037 | 828 | 135 |

DSC Analysis

Figure 6A:
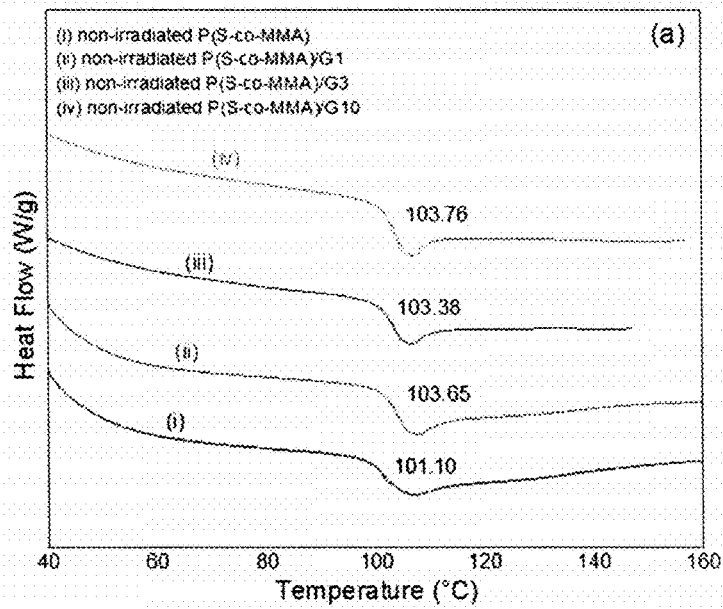
FIG. 6A is a graph showing glass transition observed from DSC for control P(S-co-MMA) and non-irradiated P(S-co-MMA)/graphene nanocomposites.
Figure 6B:
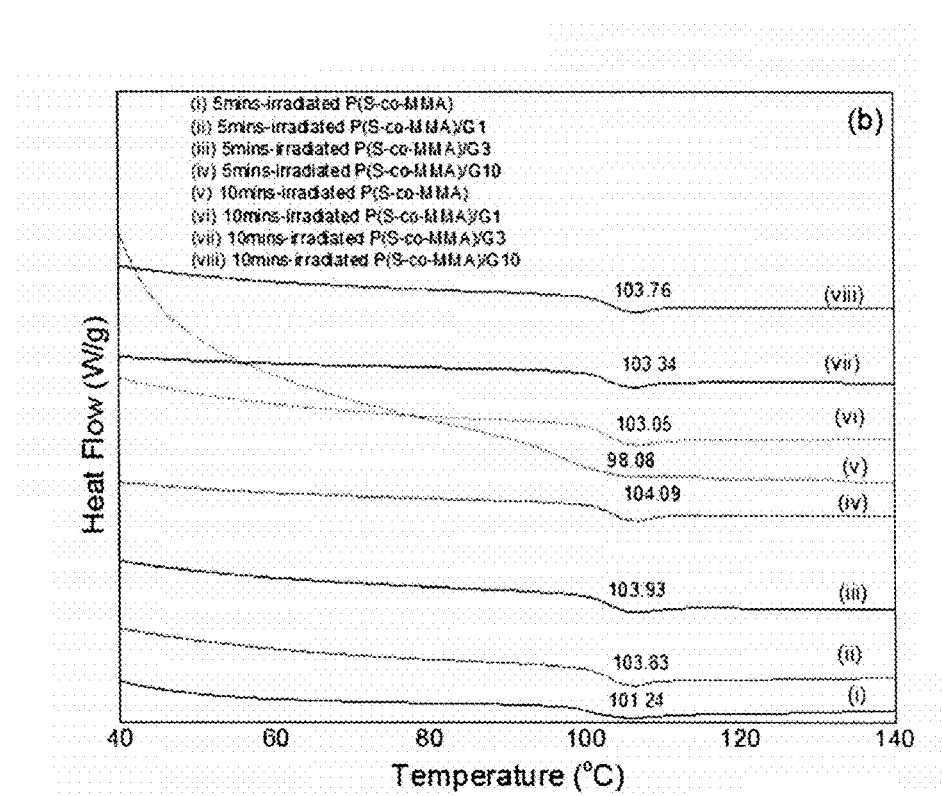
FIG. 6B is a graph showing glass transition observed from DSC of irradiated P(S-co-MMA) and P(S-co-MMA)/graphene nanocomposites.

FIG. 6A exhibits the glass transition temperature ($T_g$) of the control P(S-co-MMA), non-irradiated P(S-co-MMA)/graphene nanocomposites. FIG. 6B demonstrates the $T_g$ of irradiated P(S-co-MMA)/graphene nanocomposites. These results are the average of three different runs with an average of ±0.5° C. It was observed in FIG. 6A that there was an increase of about 2.5° C. of temperature in $T_g$ of non-irradiated P(S-co-MMA)/G1, P(S-co-MMA)/G3 and P(S-co-MMA)/G10 compared to control P(S-co-MMA). This indicates that increasing the amount of graphene content on P(S-co-MMA)/graphene has no prominent effect on the glass transition temperature of nanocomposites. This is probably due to the agglomeration or weak interfacial linkage of graphene with polymer matrix at higher loading content. After 5 and 10 minutes of irradiation, no prominent increase or decrease was observed in the $T_g$ of all P(S-co-MMA)/graphene nanocomposites (FIG. 5b).

Electrical Conductivity

The electrical conductivity of the P(S-co-MMA)/graphene nanocomposites was estimated using a four probe method. The samples P(S-co-MMA)/G1 and P(S-co-MMA)/G10 showed conductivities of $2.01 \times 10^{-6}$ S/cm and $1.2 \times 10^{-4}$ S/cm, respectively which is much higher than control P(S-co-MMA) polymer matrix. The conductivity of P(S-co-MMA)/G10 was found to ascend to $1.38 \times 10^{-3}$ S/cm after 5 minutes of irradiation. This is due to the improved interfacial interaction of graphene in the P(S-co-MMA) polymer matrix after microwave exposure, and finally improved electron conduction.

SEM Analysis

FIGS. 7A, 7B, 7C, 7D and 7E depict the SEM images of the non-irradiated, 5 minute and 10 minute irradiated samples of P(S-co-MMA)/G1 and P(S-co-MMA)/G10, respectively. In FIG. 7A, the SEM image of non-irradiated P(S-co-MMA)/G1 shows the smooth discrete surface morphology. This can be attributed to the reinforcement effect of graphene in the P(S-co-MMA)/G1 nanocomposite. Absence of any agglomerated graphene particle shows the uniform dispersion of graphene. In FIG. 7B, presence of some fracture and formation of rough surface after 5 minutes of irradiation of P(S-co-MMA)/G1 is due to the encapsulation of polymer matrix onto the graphene. This indicates that the enhancement of interfacial interaction between graphene and the polymer matrix results in stronger P(S-co-MMA)/G1 nanocomposite.

In contrast, a smoother surface of non-irradiated P(S-co-MMA)/G10 is seen in FIG. 7D. The presence of voids and a smooth surface shows the formation of graphene agglomerates and weak adhesion between graphene and the P(S-co-MMA) polymer matrix. "See Na. W, Na. G, Qinghong. F, Erfan. C, *Materials and Design.* 2011, 32, 1222-1228 (reference), incorporated herein by reference in its entirety." However, after 5 minutes of irradiation of P(S-co-MMA)/G10 (FIG. 7E), the morphology is completely changed to a rough fiber like surface. This demonstrates that the polymer chains adhered to graphene more strongly and formed an interconnecting cross linked network. This confirms that radiation facilitates improved dispersion and grafting of graphene throughout the P(S-co-MMA)/G10 nanocomposites. This cross-linked fiber-like network of 5 minutes irradiated P(S-co-MMA)/G10 nanocomposites results in improved mechanical properties and higher electrical conductivity which is also confirmed by the DMA and conductivity analyses.

In FIGS. 7C and 7F, at high irradiation time (10 minutes) of P(S-co-MMA)/G1 and P(S-co-MMA)/G10, respectively, the surface becomes smoother with some cracks on it. This results in weak interaction and adhesion between the polymer matrix and the dispersed phase of graphene. The SEM image (FIG. 7F) also shows the fractured and degraded surface of 10 minutes irradiated P(S-co-MMA)/G10 nanocomposite, captured from another part of same sample. This confirms that at high irradiation time (i.e. 10 minutes) the P(S-co-MMA) polymer started to degrade. This results in weak P(S-co-MMA)/graphene nanocomposite which is corroborated by the DMA studies in the previous section.

FTIR results confirmed improved interaction among the copolymer components and graphene after irradiation. The functionalization/disorder in graphene after microwave irradiation was observed by Raman spectroscopy. There was a significant increase in the storage modulus of P(S-co-MMA)/graphene nanocomposites after 5 minutes of irradiation. Nonetheless higher irradiation duration (10 minutes) caused degradation of P(S-co-MMA)/graphene nanocomposites. The electrical conductivity of the nanocomposites was increased after irradiation. Interaction of graphene in the copolymer matrix was assessed by XRD and SEM and the results support the concept of improvement of interfacial interaction of graphene with copolymer matrix after 5 minutes of microwave exposure and degradation of polymer chains at a higher irradiation time.

In the present disclosure, poly(styrene methyl meth acrylate)/graphene nanocomposites were prepared by melt mixing and the effects of graphene content and microwave irradiation were analyzed. FTIR and Raman spectroscopy studies confirmed the formation of defects/disorder in graphene surface after microwave irradiation. This resulted in an improvement of graphene-polymer interaction via covalent bond formation. Investigation of mechanical properties by means of DMA and dispersion by XRD, has pointed out that the microwave irradiation up to 5 minutes of P(S-co-MMA)/graphene nanocomposites particularly for 1 wt % graphene composite, is suitable for improving the interfacial interaction between the graphene and host P(S-co-MMA) matrix with a significant increase in the storage modulus. A decrease in mechanical properties of the P(S-co-MMA)/graphene nanocomposites at a higher irradiation time (10 minutes) is due to the reduction of molecular weight, resulting from the chain scission or photo degradation of the host P(S-co-MMA) polymer chains. This was confirmed from the rough damaged surface as well as appearance of cracks and holes shown by the SEM images. The present invention provides an alternative, easy and green method to enhance the molecular level dispersion and hence to provide a stronger interfacial interaction between graphene and the P(S-co-MMA) matrix, which significantly changes the final properties of the composites.

The invention claimed is:

1. A method for forming a blend comprising graphene nanoparticles and a poly(styrene-co-methylmethacrylate), the method comprising:
   melt blending the poly(styrene-co-methylmethacrylate) and the graphene nanoparticles for a time period of from 5 to 20 min to obtain a nanocomposite; and
   exposing the nanocomposite to microwave irradiation to bond the styrene-methyl methacrylate copolymer to the graphene nanoparticles,
   wherein a content of the graphene nanoparticles is from 0.05 to 2 wt % based on a total weight of the nanocomposite.

2. The method of claim 1, wherein the nanocomposite is exposed to the microwave irradiation for 2 to 9 minutes.

3. The method of claim 1, wherein the nanocomposite is exposed to the microwave irradiation for 3 to 7 minutes.

4. The method of claim 1, wherein the nanocomposite is exposed to the microwave irradiation for about 5 minutes.

5. The method of claim 1, wherein the content of the graphene nanoparticles is from 0.1 to 1.5 wt % based on the total weight of the nanocomposite.

6. The method of claim 1, wherein the content of the graphene nanoparticles is about 1 wt % based on the total weight of the nanocomposite.

7. The method of claim 1, further comprising compression molding the P(S-co-MMA)/graphene nanocomposites after the melt blending and before the exposing to microwave irradiation.

8. The method of claim 1, wherein the nanocomposite is exposed to microwave irradiation at a frequency of from 2300 to 2600 MHZ.

9. The method of claim 1, wherein the nanocomposite is exposed to microwave irradiation at a fixed power of from 900 to 1100 watts.

10. The method of claim 1, comprising exposing the nanocomposite to the microwave irradiation in cycles ranging from 40 to 80 seconds, wherein in between the cycles, the nanocomposite is cooled to room temperature for a time period ranging from 100 to 140 seconds.

11. The method of claim 1, wherein the blend has an intensity level of the D band at 1357 $cm^{-1}$ ranging from 1800 to 2200 and an intensity of the G band at 1583 $cm^{-1}$ of from 2000 to 2200.

12. The method of claim 1, wherein the blend has a storage modulus of from 800 to 1300 MPA at 120° C. and from 1400 to 1800 MPA at 40° C.

13. The method of claim 1, wherein the blend has an electrical conductivity of from $1\times10^{-3}$ to $2.0\times10^{-3}$ S/cm.

14. The method of claim 1, wherein the graphene nanoparticles are completely exfoliated in the poly(styrene-co-methylmethacrylate) after the irradiation.

15. A method for forming a nanocomposite blend comprising graphene nanoparticles and a poly(styrene-co-methylmethacrylate), the method comprising:

mixing the poly(styrene-co-methylmethacrylate) in molten form with the graphene nanoparticles for a time period of from 5 to 20 min to obtain a molten nanocomposite;

cooling the molten nanocomposite to form a solid nanocomposite; and exposing the solid nanocomposite to microwave irradiation to covalently bond the styrene-methyl methacrylate copolymer to the graphene nanoparticles and form the nanocomposite blend, wherein a content of the graphene nanoparticles in the nanocomposite blend is from 0.05 to 2 wt % based on a total weight of the nanocomposite blend.

16. A method for forming a nanocomposite blend comprising graphene nanoparticles and a poly(styrene-co-methylmethacrylate), the method comprising:

mixing the graphene nanoparticles and the poly(styrene-co-methylmethacrylate) to form a solid molding mixture, compression molding the solid molding mixture to form a solid nanocomposite; and exposing the solid nanocomposite to microwave irradiation to form the nanocomposite blend in which the styrene-methyl methacrylate copolymer is covalently bonded to the graphene nanoparticles, wherein a content of the graphene nanoparticles in the nanocomposite blend is from 0.05 to 2 wt % based on a total weight of the nanocomposite blend.

* * * * *